June 18, 1968  D. W. ROPER  3,388,779
DRIVE DIFFERENTIAL WITH TWO-WAY OVERRUNNING CLUTCH AND
TEMPERATURE COMPENSATING OPERATOR
Filed March 15, 1966  2 Sheets-Sheet 1

INVENTOR
DANIEL W. ROPER
BY
Hoffmann and Yount
ATTORNEYS

June 18, 1968 D. W. ROPER 3,388,779
DRIVE DIFFERENTIAL WITH TWO-WAY OVERRUNNING CLUTCH AND
TEMPERATURE COMPENSATING OPERATOR
Filed March 15, 1966 2 Sheets-Sheet 2

INVENTOR
DANIEL W. ROPER

BY
*Hoffmann and Yount*

ATTORNEYS

United States Patent Office 3,388,779
Patented June 18, 1968

3,388,779
DRIVE DIFFERENTIAL WITH TWO-WAY OVER-
RUNNING CLUTCH AND TEMPERATURE COM-
PENSATING OPERATOR
Daniel W. Roper, Rochester, Mich., assignor to Eaton
Yale & Towne Inc., Cleveland, Ohio, a corporation of
Ohio
Filed Mar. 15, 1966, Ser. No. 534,342
15 Claims. (Cl. 192—44)

ABSTRACT OF THE DISCLOSURE

A drive mechanism comprises clutch means located between driving and driven members and movable between an engaged position drivingly connecting the members and a disengaged position providing for relative rotation between the driving and driven members. An actuating means is operable to move the clutch means to its disengaged position at a predetermined slip speed between the driving and driven members, and temperature compensating means is operatively associated with the clutch means and urges the clutch means to its disengaged position with a force which varies with changes in temperature. The temperature compensation is such that the clutch means is moved to its engaged position at approximately the same predetermined slip speed between the driving and driven members regardless of temperature.

---

The present invention relates to a drive mechanism and more particularly relates to a limited slip differential drive mechanism having a clutch means operative to drivingly connect driving and driven members thereof at a predetermined slip speed therebetween.

A principal object of the present invention is the provision of a new and improved drive mechanism including driving and driven members and clutch means for drivingly connecting the members and wherein the clutch means is moved to its engaged position drivingly connecting the members against a disengaging force which is overcome at a predetermined slip between the members and wherein the disengaging force varies to compensate for changes in the engaging force effected by temperature changes so that the driving and driven members are drivingly connected at a substantially constant slip speed therebetween regardless of temperature.

Another object of the present invention is the provision of a new and improved drive mechanism including driving and driven members and drive elements movable to drivingly connect the driving and driven members at a predetermined slip speed therebetween by the action of a viscous fluid coupling which acts against a temperature compensator and wherein the temperature compensator applies a force to the drive elements which force varies with temperature changes to compensate for viscosity changes of the viscous fluid so that the driving and driven members are drivingly connected at substantially the same predetermined slip speed between the driving and driven members at all temperatures.

Another object of the present invention is the provision of a new and improved drive mechanism having drive transmitting elements which are moved to drivingly connect rotatable members at a predetermined slip speed therebetween by operation of a viscous shear fluid coupling and wherein the drive transmitting elements are urged toward a disengaged position by a circumferentially stressed annular member and which is so constructed and arranged that the circumferential stress in the member changes substantially with changes in temperature to compensate for changes in viscosity of the shear fluid to permit driving engagement of the rotatable members at a predetermined slip speed therebetween throughout a wide temperature range.

Another object of the present invention is the provision of a new and improved drive mechanism having drive transmitting elements movable to drivingly connect driving and driven members at a predetermined slip speed therebetween by operation of a viscous shear coupling, and wherein an annular member constructed of a material having a high coefficient of thermal expansion includes portions urging the drive transmitting elements toward a disengaged position with a force which is variable in response to temperature changes and also includes a shear surface of the viscous coupling so that temperature changes effect movement of the shear surface of the shear coupling toward and away from each other.

Further objects and advantages of the present invention will become apparent to those skilled in the art to which it relates from the following detailed description of the preferred embodiment thereof made with reference to the accompanying drawings forming a part of the specification and wherein.

Figure 1:
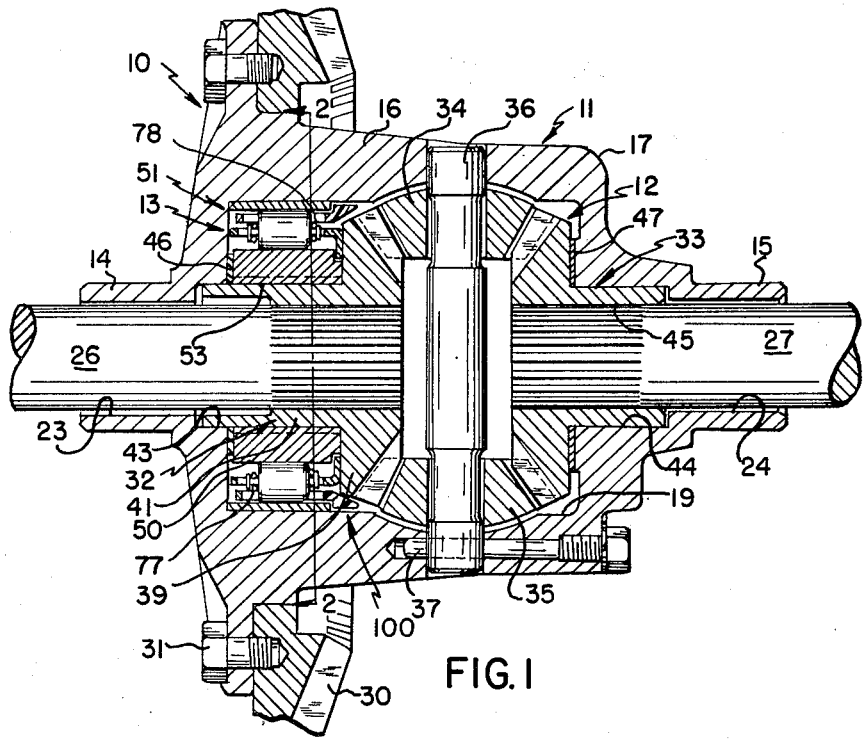
FIG. 1 is an axial sectional view taken through a drive mechanism embodying the present invention.
Figure 2:
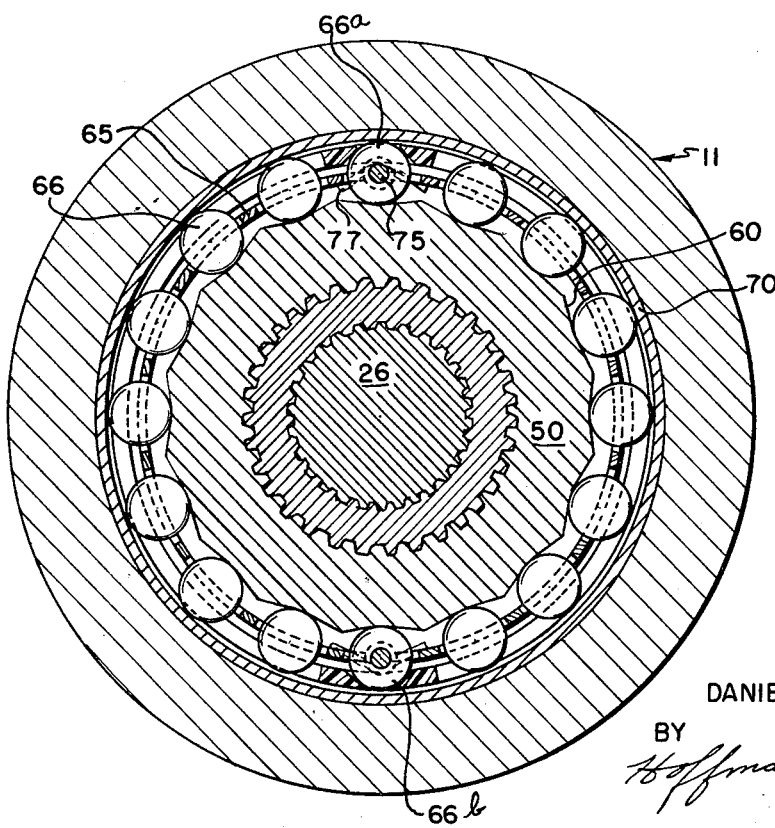
FIG. 2 is a transverse sectional view of the mechanism of FIG. 1 taken approximately along section line 2—2 of FIG. 1.

The present invention provides a new and improved drive mechanism having relatively rotatable input and output members and clutch means for drivingly connecting the members in response to relative rotation therebetween. As representing the preferred embodiment of the present invention, a differential drive mechanism 10 is illustrated in FIG. 1 and is especially suitable for use in driving the wheels of a vehicle. The differential drive mechanism 10 comprises, in general, a rotatable planet gear carrier 11, a differential gear train 12, and a clutch mechanism 13 operable to retard rotation of one the gears of the gear train 12 relative to the planet gear carrier 11.

The planet gear carrier 11 includes a pair of support portions 14 and 15 adapted to be received in bearings of a supporting structure, such as an axle housing, not shown, by which the carrier 11 is rotatably supported. The carrier 11 includes a pair of members 16 and 17 which are secured together by suitable means, not shown, and which define a chamber 19 in which the gear train 12 and the clutch means 13 are located. The support portions 14, 15 of the planet gear carrier 11 are formed at opposite ends thereof and are provided with openings 23, 24, respectively, extending therethrough. The openings 23, 24 are disposed in an aligned relation on a common axis which is also the rotational axis of the carrier 11. The axial openings 23, 24 communicate with the chamber 19 and receive or accommodate the driven or power output means which are here represented by axle shafts 26, 27, respectively, whose outer ends are connected with traction wheels, or the like, not shown, and whose inner or adjacent ends are connected with the gear train 12, as will be described hereinbelow.

The differential mechanism 10 includes a conventional ring gear 30 extending around and mounted on the carrier 11 by means of connecting screws 31 which extend through a flange which forms a part of the planet carrier 11. A suitable drive pinion, not shown, meshes with the ring gear 30 and represents the power input means for the differential mechanism 10 and upon rotation effects rotation of the ring gear 30, and rotation of the ring gear 30, of course, effects rotation of the planet carrier 11.

The gear train 12 is operable to transmit the rotary motion of the planet carrier 11 to the output shafts 26, 27. The gear train 12 comprises a pair of beveled type side gears 32, 33, and a group of beveled pinion planetary gears, in this case two such gears, 34, 35 disposed between and in meshed engagement with the side gears 32, 33 for drivingly connecting the latter. The planetary gears 34, 35 are rotatably supported by the carrier 11 by means of a pinion shaft 36 extending across the gear chamber 19 and secured in the casing by a suitable anchor pin 37 extending through the pinion shaft transversely thereof.

The side gears 32, 33 and the pinion gears 34, 35 are, in the preferred embodiment, all bevel gears of conventional form as far as the teeth thereof are concerned, and the tooth profiles are of a conventional shape having pressure angle values coming within the usual range of such values. The side gears 32, 33, while in the preferred embodiment, comprise bevel gears, may take other known forms and each of the gears 32, 33 comprises an annular body 39 having teeth formed thereon and a central hollow sleeve or hub 41 connected with the body and extending coaxially with the axis of rotation of the side gears. The carrier 11 is provided with hollow annular or axial sockets 43, 44 into which the hub portions 41 of the gears 32, 33, respectively, extend and which rotatably receive the gears. The gears 32, 33 are provided with splines 45 in the hub openings thereof which are engaged by corresponding splines formed on the inner ends of the axle shafts 26, 27, respectively, for drivingly connecting said shaft with the side gears. Thrust washers 46, 47 are interposed between the carrier 11 and the side gears 32, 33 to absorb axial thrust of the side gears as well as to control backlash between the side and pinion gears.

The clutch means 13 is a double overrunning clutch operable to retard relative rotation of the side gear 32 with respect to the planet carrier 11. The clutch means 13 acts between the planet carrier and a member 50 drivingly connected with the side gear 32. The member 50 comprises an annular sleeve member which has an opening therethrough and is internally splined at 53 and supported on the hub portion 41 of the gear 32 with the splines 53 thereof cooperating with splines on the outer portion of the hub 41 of the gear 32. The member 50, as a result of its splined connection to the hub portion 41 of the gear 32, rotates with the gear 32. The outer periphery of the member 50 is composed of a plurality of V-shaped grooves 60. The grooves 60 are spaced annularly apart and extend axially along the member 50 and are of only a slight depth.

The clutch means 13 includes a roller cage mechanism 51 which comprises a shiftable roller cage 65 and a plurality of rollers 66, supported by the shiftable roller cage 65, corresponding in number to the number of V-shaped grooves 60 on the member 50. The rollers 66 engage sides of the V-shaped grooves 60 on the member 50 and are located in openings in the roller cage 65. Shifting movement of the roller cage and the rollers relative to the member 50 will, of course, occur simultaneously.

Figure 3:
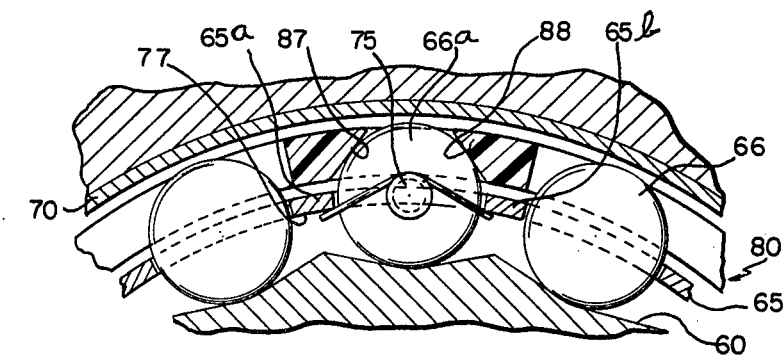
FIG. 3 is a fragmentary sectional view of a portion of the mechanism shown in FIG. 1.
Figure 4:
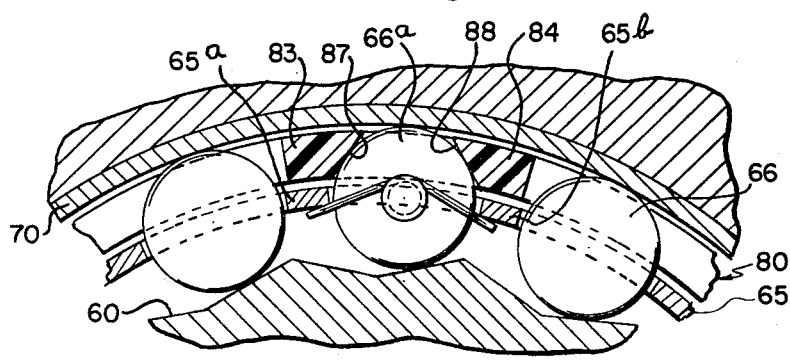
FIG. 4 is a fragmentary sectional view similar to FIG. 3 with parts thereof in a different position.
Figure 5:
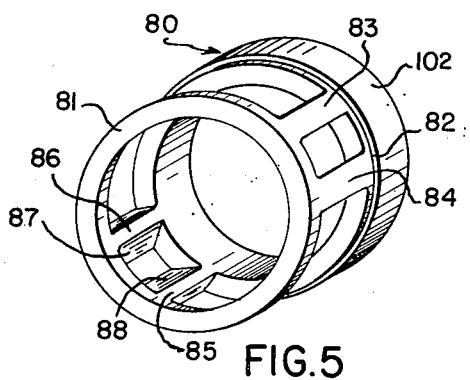
FIG. 5 is a perspective view of a portion of the mechanism shown in FIG. 1.

The roller cage mechanism 51 is shiftable or movable, as noted above, from a position shown in FIG. 3 wherein the rollers 66 permit free wheeling of the side gear and the planet carrier 11, to a position wherein the rollers 66 are wedgingly engaged between side surfaces of the grooves 60 and an arcuate surface of a hardened insert member 70, which is pressed into the differential housing member 16. FIG. 4 illustrates the cage mechanism 51 in its engaged position. When the rollers 66 are wedgingly engaged with these surfaces, the planet carrier 11 is drivingly connected to the sleeve member 50 which in turn is drivingly connected to the side gear 32, and in this position relative movement of the side gear 32 and the carrier 11 is prevented.

Means is provided for yieldably holding the roller cage 51 in its centered or neutral position. In the illustrated and preferred embodiment a biasing means is operative to provide a force biasing the rollers 66 and the roller cage 65 into a centered or neutral position wherein the rollers 66 are not drivingly engaged with the carrier 11 and the side gear 32. The biasing means may take different forms but as shown in FIG. 3 includes a spring detent roller arrangement which includes diametrically spaced rollers 66a and 66b. The rollers 66a and 66b include stem portions 75 which extend axially outwardly of the rollers 66a and 66b respectively as best shown in respect to the roller 66a in FIG. 3. Encircling the stem portions 75 are spring members 77, 78 respectively. The spring members encircle the opposite stem portions of the rollers 66a and the opposite ends of the springs engage portions 65a, 65b of the roller cage intermediate the openings in the roller cage in which the roller 66a is located.

From the above description, it should be apparent that as the roller 66a tends to move out of the bottom of the V-grooves 60, the roller will rise relative to the springs 77, 78. The springs 77, 78 resist upward movement of the roller and tend to hold the roller in the bottom of the V-groove. Of course, once the force applied to the roller 66a by the springs 77, 78 is overcome, the roller 66a will move upwardly out the bottom of the V-groove and permit shifting of the roller cage 65 so that the rollers 66 carried thereby move into driving engagement with the surfaces of the grooves 60 and the insert member 70.

In accordance with the present invention, the clutch means 13 includes a temperature compensating member 80 which functions to bias the rollers 66a and 66b toward their disengaged position. The temperature compensating member 80 is an annular member which surrounds the rollers 66 and the roller cage 65. The temperature compensating member 80 includes a thin annular ring-like portion 81 and a relatively heavier ring-like portion 82 spaced axially therefrom by four cross members, or struts, 83, 84, 85, 86. The struts are located in pairs with struts 83, 84 located diametrically opposite struts 85, 86 on the rings 81, 82 and are preferably formed continuously therewith as one integral part. Each pair of struts is associated with one of the rollers 66a, 66b, respectively. The struts 83, 84 have wedging surfaces 87, 88, respectively, engageable with spaced points on the periphery of the roller 66a. The surfaces 87 and 88 are angularly related to the periphery of the roller 66a to provide a force on the roller tending to urge the roller to the bottom of the V-groove 60, as best shown in FIG. 3. The struts 85, 86 are associated with roller 66b in the same manner as struts 83 84 are associated with roller 66a.

The temperature compensating member 80 is preferably constructed of a material having a high coefficient of thermal expansion and when the member is assembled around the roller cage mechanism 51 it is preferably circumferentially stressed to urge the rollers toward the bottoms of the V-grooves as described. Due to the high coefficient of thermal expansion of the temperature compensating member 80, the circumferential stress therein is reduced when the temperature compensating member 80 expands, due to temperature increases, and conversely the circumferential stress is increased when the temperature compensating member 80 contracts in response to temperature decreases. It should be apparent then that the rollers 66a, 66b are urged toward their disengaged positions by a force which is related to the circumferential stress in the member 80 and which is variable in response to temperature changes. The temperature compensating member 80 may be constructed from any material having the properties described, but is preferably constructed of polyformaldehyde, a plastic which is known commercially as Delrin.

While the rollers 66 are biased toward their disengaged position by springs 77, 78 and member 80, they may be moved into driving engagement between the differential gear casing 11 and the member 50 against the bias of the springs and the temperature compensating member 80. The means for moving the roller cage so that the rollers drivingly engage a surface of the V-grooves 60 and the surface of the member 70 comprises a viscous coupling mechanism generally designated 100.

The viscous coupling mechanism 100 includes the ring-like portion 82 of the temperature compensating member 80. The portion 82 of the member 80 extends axially of the side gear and away from the rollers 66 and includes an annular surface 102 on the outer periphery thereof which lies adjacent an annular surface 103 formed on the interior of the planet carrier 11. The surfaces 102, 103 form a viscous shear space therebetween in which a viscous shear fluid is located to function as a drive connection between the planet carrier 11 and the portion 82 of the member 80.

Upon a predetermined speed of relative rotation of the planet carrier 11 relative to the side gear 32 and sleeve member 50, the drive force applied by the shear fluid of the viscous coupling 100 overcomes the bias of the springs 77, 78 and the force applied to the rollers by the member 80 through the surfaces 87, 88 and effects shifting movement of the roller cage mechanism 51. The shifting force of the viscous coupling 100 is imparted to the mechanism 51 through engagement between either the wedging surfaces 87 or 88 and the rollers 66a, 66b depending on the direction of relative rotation between the planet carrier 11 and the member 50. This shifting movement effects movement of the roller cage 65 and the rollers 66 carried thereby into driving engagement between surfaces of the grooves 60 and the member 70.

Figure 6:
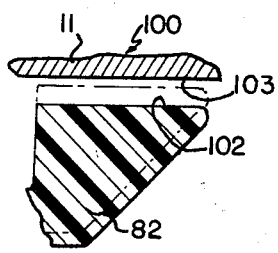
FIG. 6 is a fragmentary sectional view on an enlarged scale of a portion of the mechanism shown in FIG. 1.

The portion 82 of the temperature compensating member 80 expands and contracts relative to the planet carrier 11 with changes in temperature of the shear fluid to decrease and increase the distance between the shear surfaces 102 and 103 as shown in phantom lines in FIG. 6. As shear fluid temperatures increase and decrease, the viscosity of the shear fluid decreases and increases respectively so that the change in distance between the shear surfaces 102 and 103 tends to compensate for the changes in viscosity of the shear fluid effected by the temperature changes. More specifically, if the viscosity decreases with an increase in temperature the shear surfaces 102, 103 move closer together and if the viscosity increases with a decrease in temperature the shear surfaces 102, 103 move apart. As a result of the above, the engaging force exerted by the coupling 100 on the clutch means 13 tends to be fairly constant for any given slip speed over a wide temperature range. However, the expansion and contraction of the portion 82 does not fully compensate for changes in fluid viscosity.

Changes in viscosity of the shear fluid effected by temperature changes are additionally compensated for by the temperature responsive centering force exerted on the rollers 66a, 66b by the struts 83–86 as described above, so that engagement of the roller cage mechanism 51 between the surfaces of the grooves 60 and the member 70 is effected at generally the same slip speed throughout the temperature range of the mechanism. This constant speed engagement is effected in part by the relationship between the struts 83–86 and the rollers 66a, 66b. During cold operation the struts provide a high centering or disengaging force on the rollers, requiring a larger viscous shear force to cause engagement of the clutch means 13. As temperatures increase, the temperature compensating member 80 expands to lessen the centering or disengaging force, thereby allowing engagement of the clutch means 13 with a lesser viscous shear force.

If the planet carrier 11 rotates relative to the side gear 32 as when the traction wheel connected with the output shaft 27 slips, the viscous coupling mechanism 100 operates to tend to drag the roller cage mechanism 51 in the direction of rotation of the planet gear 11, and if the relative rotation is sufficient to overcome the force of the biasing springs and the temperature compensating member 80, the planet carrier 11 and side gear 32 are locked together by the rollers 66. If the side gear 32 rotates relative to the carrier 11, as when the traction wheel which is connected to the output shaft 26 slips, the viscous coupling tends to maintain the roller cage mechanism 51 rotating at a speed which is a function of the speed of the carrier 11 and thus at a speed lower than that of the side gear 32 and the sleeve member 50. As a result, the side gear rotates relative to the roller cage mechanism 51 and effects a drive connection between the planet carrier 11 and side gear 32 through the rollers 66. This drive connection again is effected only if the relative rotation between the planet gear 11 and side gear is sufficient to provide a force overcoming the biasing force exerted on the rollers 66 by the springs 77, 78 and the struts 83–86.

It can now be seen that a drive mechanism has been provided which includes drive transmitting elements acting between spaced surfaces on relatively rotatable members to drivingly engage the members at a predetermined relative speed of rotation in response to operation of a viscous shear coupling, and that a temperature compensating member has been provided which actuates the drive transmitting elements into driving relation between the members at the predetermined relative speed therebetween in a manner which is independent of changes in viscosity of the viscous shear fluid effected by temperature changes.

Although a preferred embodiment of the present invention has been described hereinabove in considerable detail, the invention is not to be considered limited to the precise structure shown and described herein. It is my intention to cover hereby all adaptations, modifications and uses of the present invention coming within the scope of the appended claims.

Having described my invention, I claim:

1. A drive mechanism for drivingly connecting driving and driven members at a predetermined slip speed therebetween comprising clutch means located between said driving and driven members and movable between a first position providing for free wheeling of said driving and driven members and a second position drivingly connecting said driving and driven members for rotation at a common speed, actuating means operable to move said clutch means from said first position to said second position at said predetermined slip speed between said driving and driven members including a viscous shear fluid coupling operable by the action of viscous shear fluid, and temperature compensating means independent of said actuating means and operatively associated with said clutch means to urge said clutch means toward said first position against the action of said viscous shear fluid coupling with the force applied to said clutch means by said temperature compensating means increasing upon a decrease in temperature and decreasing upon an increase in temperature to compensate for increases and decreases in fluid viscosity effected by said temperature decreases and increases.

2. A drive mechanism as defined in claim 1 wherein said temperature compensating means includes an annular circumferentially stressed member engaging said clutch means, the circumferential stress in said member varying substantially with changes in temperature to change the disengaging force applied to said clutch means.

3. A drive mechanism as defined in claim 2 further including spring means operable to urge said clutch means from said second to said first position.

4. A drive mechanism as defined in claim 3 wherein said annular member extends peripherally of said clutch means and includes spaced surfaces therein engageable with said clutch means to urge said clutch means toward its disengaged position.

5. A drive mechanism as defined in claim 4 wherein said annular member includes a fluid shear surface of said viscous fluid shear coupling, said surface positioned adjacent said annular surface on one of said driving or driven members to form a fluid shear space therebetween, said first mentioned fluid shear surface movable toward and away from said surface on said one member in response to temperature changes to compensate for changes in viscosity of said shear fluid effected by said temperature changes.

6. A drive mechanism as defined in claim 5 wherein said annular member is formed of a flexible material having a substantially higher coefficient of thermal expansion than the material of said one of said members.

7. A drive mechanism as defined in claim 6 wherein said clutch means includes a plurality of rollers and said annular member includes a pair of ring portions interconnected by struts, said struts having surfaces engaging certain of said rollers and urging said rollers to said first position.

8. A mechanism for use with a clutch means which drivingly connects rotatable driving and driven members at a predetermined slip speed therebetween comprising a first annular member engageable with the clutch means to urge the clutch means toward a disengaged position, a second annular member independent of said first annular member including a generally annular surface extensible adjacent an annular surface on one of said rotatable members and forming a space therebetween for containing a viscous shear fluid, said surface on said member movable toward and away from said surface on said one rotatable member in response to temperature changes and said disengaging force applied by said member to said clutch means changing substantially with changes in temperature whereby changes in viscosity of said fluid are compensated for and said rotatable members are engaged at said predetermined slip speed over a wide temperature range, and said second annular member being constructed of a material having a substantially higher coefficient of thermal expansion than the material of said rotatable members.

9. A drive mechanism as defined in claim 8 wherein said second annular member includes first and second generally annular ring-like portions spaced apart by axially extending struts.

10. A drive mechanism comprising rotatable power input means, first and second driven output means, differential gear means for driving said first and second driven output means from said input means and providing a differential action between first and second driven output means, said differential gear means including first and second differential side gears drivingly connected to said first and second output means to effect rotation of said output means upon rotation of said side gears and a rotatable planet gear carrier drivingly connected with said input means and at least one planetary gear rotatably mounted on said planet gear carrier and meshing with said side gears to drive the same, clutch means operatively associated between spaced drive surfaces on said input means and one of said output means respectively said clutch means being movable between an engaged position wherein said input and output means are drivingly connected atnd a disengaged position permitting relative rotation between said input and output means, and actuating means operable to move said clutch means from its said disengaged position to its engaged position, said actuating means including first and second spaced opposed viscous shear surfaces forming a viscous shear spaced therebetween, said surfaces being movable toward and away from each other in response to temperature changes with movement thereof related to changes in viscosity of a viscous shear fluid in said shear space, and force applying means independent of said actuating means and operative to urge said clutch means toward said disengaged position, the force applied by said force applying means varying substantially with changes in temperature to compensate for changes in viscosity of said viscous shear fluid effected by temperature changes.

11. The drive mechanism as defined in claim 10 wherein said clutch means includes a plurality of elements movable into wedging engagement between said members, and a cage member associated with said elements and supporting said elements for movement between said engaged and disengaged positions, said force applying means surrounding said elements and said cage member and including spaced surfaces engageable with at least one of said elements, said spaced surfaces applying a temperature responsive force to said one element and urging said one element and said cage member toward said disengaged position.

12. The drive mechanism as defined in claim 11 wherein said force applying means comprises an annular member having first and second annular ring-like portions spaced apart by axially extending members, said axially extending members including said surfaces engageable with said parts of said clutch means, and said ring-like portions being formed of a material having a relatively high coefficient of thermal expansion.

13. The drive mechanism as defined in claim 12 wherein said one of said viscous shear surfaces is formed on one of said ring-like parts.

14. The drive mechanism as defined in claim 13 wherein said ring-like parts surround said clutch means and are circumferentially stressed to maintain said clutch parts in said disengaged position, the circumferential stress of said members varying with changes in temperature to change said disengaging force to compensate for changes in viscosity of said shear fluid effected by changes in temperature.

15. A drive mechanism for drivingly connecting driving and driven members at a predetermined slip speed therebetween comprising clutch means located between said driving and driven members and movable between a first position providing for free wheeling of said driving and driven members and a second position drivingly connecting said driving and driven members for rotation at a common speed, actuating means operable to move said clutch means from said first position to said second position at said predetermined slip speed between said driving and driven members and applying a first force to said clutch means which varies in response to temperature changes at any given slip speed between the members, and temperature compensating means operatively associated with said clutch means to urge said clutch means toward said first position with a second force which varies with the changes in temperature, said second force varying with temperature to compensate for temperature responsive changes in said first force whereby said clutch means is moved to said second position at said predetermined slip speed regardless of temperature.

References Cited
UNITED STATES PATENTS

| | | | |
|---|---|---|---|
| 2,292,988 | 9/1942 | Bloomfield | 192—45 |
| 2,699,846 | 1/1955 | Pitman. | |
| 3,324,744 | 5/1967 | Roper | 192—44 |

MARTIN P. SCHWADRON, *Primary Examiner.*

MARK M. NEWMAN, *Examiner.*

C. M. LEEDOM, *Assistant Examiner.*